(12) United States Patent
Honeycutt

(10) Patent No.: US 7,832,549 B2
(45) Date of Patent: Nov. 16, 2010

(54) CURVED CONVEYOR WITH GUIDE FOR PREVENTING RADIAL BELT MIGRATION

(75) Inventor: James Honeycutt, Grandville, MI (US)

(73) Assignee: Thermodrive LLC, Grand Rapids, MI (US)

( * ) Notice: Subject to any disclaimer, the term of this patent is extended or adjusted under 35 U.S.C. 154(b) by 0 days.

(21) Appl. No.: 12/278,783

(22) PCT Filed: Feb. 8, 2007

(86) PCT No.: PCT/US2007/061855

§ 371 (c)(1),
(2), (4) Date: Aug. 8, 2008

(87) PCT Pub. No.: WO2007/092928

PCT Pub. Date: Aug. 16, 2007

(65) Prior Publication Data

US 2009/0000920 A1    Jan. 1, 2009

Related U.S. Application Data

(60) Provisional application No. 60/743,253, filed on Feb. 8, 2006.

(51) Int. Cl.
B65G 15/02 (2006.01)
B65G 21/22 (2006.01)
B65G 15/62 (2006.01)

(52) U.S. Cl. .................... 198/831; 198/839; 198/840; 198/841; 198/834

(58) Field of Classification Search ............ 198/831, 198/834, 835, 839, 840, 841
See application file for complete search history.

(56) References Cited

U.S. PATENT DOCUMENTS

| | | | | |
|---|---|---|---|---|
| 1,254,941 A * | 1/1918 | Snow | .......... | 198/831 |
| 2,800,218 A * | 7/1957 | Drouin | .......... | 198/831 |
| 4,179,026 A | 12/1979 | de Vries | | |
| 5,415,273 A * | 5/1995 | Peterson | .......... | 198/831 |
| 5,470,293 A * | 11/1995 | Schonenberger | .......... | 482/54 |
| 5,630,500 A * | 5/1997 | Conrad | .......... | 198/833 |
| 5,667,058 A | 9/1997 | Bonnet | | |
| 6,298,982 B1 * | 10/2001 | Layne et al. | .......... | 198/831 |
| 6,564,932 B2 * | 5/2003 | Itoh | .......... | 198/835 |
| 6,866,141 B2 * | 3/2005 | Saeki | .......... | 198/844.2 |
| 7,021,457 B1 * | 4/2006 | Schiltz | .......... | 198/835 |
| 7,073,660 B1 * | 7/2006 | Hishinuma | .......... | 198/831 |
| 7,246,697 B2 * | 7/2007 | Hosch et al. | .......... | 198/831 |
| 2007/0175737 A1 * | 8/2007 | Honeycutt et al. | .......... | 198/822 |

* cited by examiner

*Primary Examiner*—Mark A Deuble
(74) *Attorney, Agent, or Firm*—McGarry Bair PC

(57) ABSTRACT

A curved conveyor comprises a toothed, endless belt and a slider bed that supports a portion of the belt. The slider bed can include at least one guide in the form of a rail extending along the slider bed in the direction of belt travel. Each of the belt teeth are discontinuous and have at least one gap sized to receive the at least one guide; thus, the at least one guide prevents inward radial migration of the belt during movement of the belt. The conveyor can further comprise a center guide wheel or a guide post to prevent belt radial migration.

15 Claims, 14 Drawing Sheets

CURVED CONVEYOR WITH GUIDE FOR PREVENTING RADIAL BELT MIGRATION

CROSS-REFERENCE TO RELATED APPLICATIONS

This application is a national phase of International Application No. PCT/US2007/061855, filed Feb. 8, 2007, and claims priority from U.S. Application Ser. No. 60/743,253 filed Feb. 8, 2006.

BACKGROUND OF THE INVENTION

1. Field of the Invention

The invention relates to a curved conveyor with a toothed, endless belt and a guide for preventing radial migration of the belt.

2. Description of the Related Art

Conveyors are well-known apparatuses with belts for moving objects from one location to another and can comprise straight sections and curved sections. In curved conveyors, the speed of the belt inside edge (i.e., the smaller radius edge) is slower than the speed of the belt outside edge (i.e., the larger radius edge).

Some types of belts comprise multiple interlocking panels or modules that can compensate for this difference in speed by moving relative one another. For example, interlocking panels, such as those often utilized in baggage claim conveyors in airports, can overlap one another at the belt inside edge as the belt moves around the curved section of the conveyor. Modular belts comprise interlocking modules that can slide or otherwise move relative to one another to effectively alter the spacing between modules. As the modular belt moves around the curve, the spacing between the modules at the inside edge of the belt decreases while the spacing between the modules increases at the outside edge of the belt. A chain belt behaves similarly to the modular belt, except that links in the chain belt can move relative to one another. Tension on the belt in the curve tends to force the belt radially inward, thereby causing the belt to migrate inward while moving along the curved conveyor. A rigid belt, such as found in interlocking panels, tends to inherently resist inward migration, and additional resistance to migration is typically provided by a guide on the inside radius. Resistance to inward migration for a chain belt is provided by the sprockets' engagement with the chain links.

While the above conveyor belts compensate for the turn radius in a curved conveyor belt and offer some solutions to the problem of inward migration, they are not optimal for use in certain industries, such as the food industry. In the food industry, hygiene and cleanliness are critical, and fluids and debris can become lodged in the joints of the interconnecting panels, links, chains, and the like and are difficult to sanitarily remove. Endless thermoplastic belts having a generally continuous, smooth upper surface are preferred for use in the food industry.

One type of conveyor with an endless belt comprises a tensioned flat belt having smooth upper and lower surfaces and extending between a drive pulley and a tail piece (typically a pulley or a fixed bar). Friction between the drive pulley and the belt enables transfer of torque from the former to the latter to thereby induce movement of the belt.

The friction driven endless belt has the desired smooth upper surface, but the aforementioned problems associated with radial migration in a curved conveyor still exist. Prior art solutions for overcoming the radial inward force include guiding or tracking devices that support an outside edge of the belt and counteract the inward force. These devices are positioned along the curve and are located radially outwardly of the belt, such as along the edge of the belt.

Although these guiding devices function to prevent radial migration of the belt, friction driven endless belts are still not optimal for industries such as the food industry. Because tension on the belt is required to maintain the requisite friction for moving the belt, this type of conveyor does not performs well in environments where the tension and friction can be compromised. In the food industry, introduction of grease and effluents from food products can result in a loss of friction and thereby detrimentally affect the performance of the conveyor.

Alternatively, another conveyor with an endless belt comprises a low friction, direct drive belt having a flat upper surface and teeth-on a lower surface. This type of conveyor has the seamless flat upper surface that is easy to clean and overcomes the tension and friction problems associated with the friction driven flat belts. The teeth engage sheaves on a drive sprocket to transfer torque to the belt without requiring friction between the belt and the drive sprocket or tension in the belt. Such a conveyor is disclosed in U.S. Patent Application No. 60/593,493, which is incorporated herein by reference in its entirety. However, some radial migration of the low tension, direct drive belt remains an issue.

SUMMARY OF THE INVENTION

A curved conveyor according to the invention has an endless belt with an inside edge and an outside edge. The outside edge is longer than the inside edge to accommodate moving the belt on the radius of a curve. A drive pulley is mounted for rotation. The belt or the drive pulley has teeth and the other has sheaves, with at least one tooth in driving engagement with a sheave as the belt wraps around the pulley. A fixed guide engages the belt in the curve to resist radial migration of the belt inwardly of the curve.

In one embodiment, the guide comprises a rail on a slider bed. In another embodiment, the guide comprises a center guide wheel. In a further embodiment, the guide comprises at least one guide post positioned along the inside edge of the belt. There can be a plurality of each, either alone or in combination with each other.

Preferably, the belt is formed of thermoplastic and the belt has teeth and the drive pulley has sheaves. In this case, the drive pulley is conical in shape.

DETAILED DESCRIPTION

Figure 1:
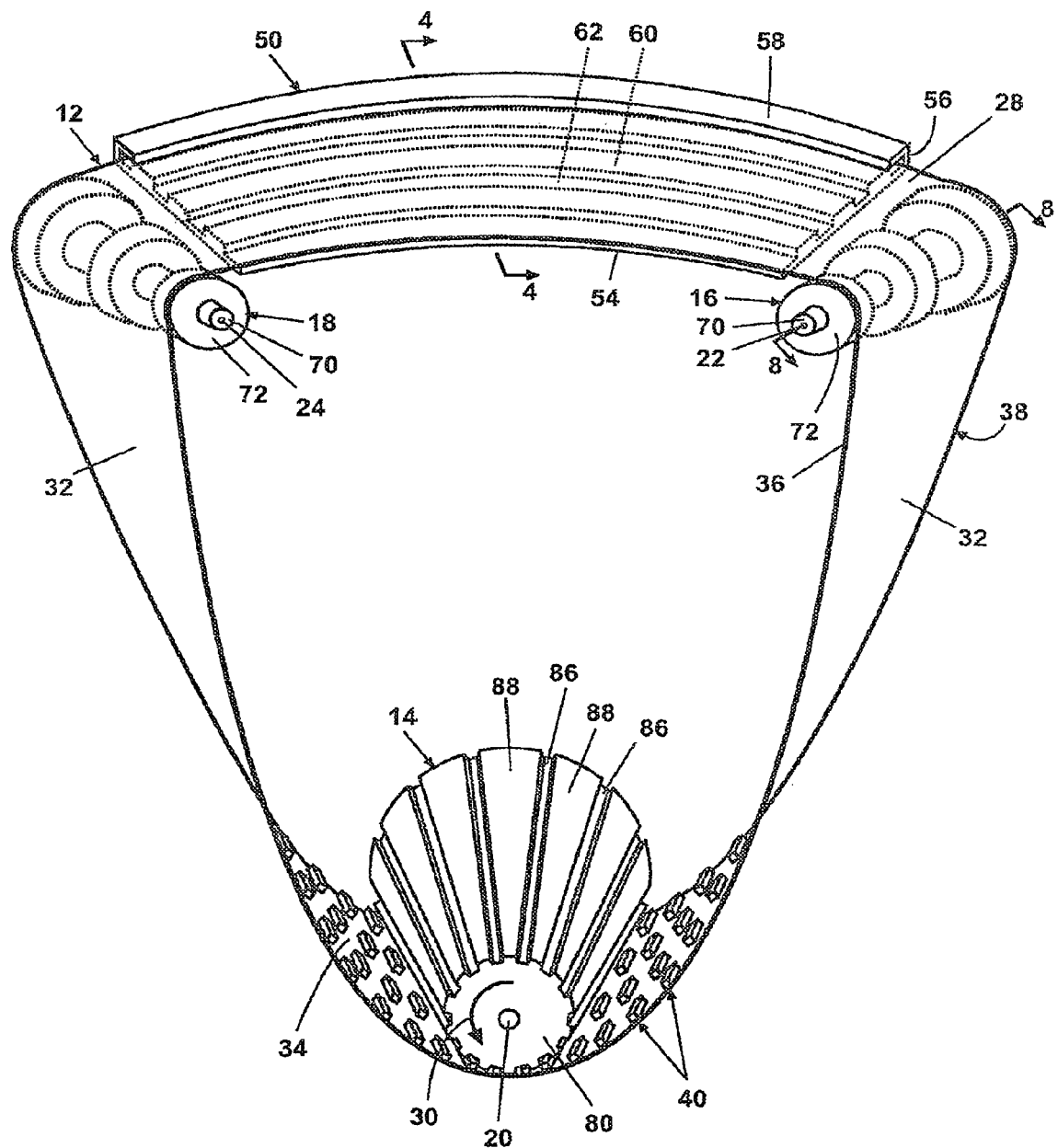
FIG. 1 is a perspective view of a center drive curved conveyor having a toothed, endless belt supported by a slider bed according to one embodiment of the invention.

A curved conveyor according to the invention provides an endless toothed conveyor belt and a guide for preventing radial migration of the belt. Referring now to the figures, FIG. 1 illustrates a first embodiment of a conveyor 10 comprising an endless toothed belt 12 in an exemplary center drive installation. "Endless" in this sense means a belt with or without a splice, or having ends joined in some manner so as to form a continuous loop. The belt 12 wraps around a drive pulley 14 and two idler or slave pulleys 16, 18, with each of the pulleys 14, 16, 18 mounted for rotation on a respective central shaft 20, 22, 24. In the illustrated embodiment, the drive pulley 14 is a sprocket comprising a plurality of teeth and sheaves, while the idler pulleys 16, 18 do not include any teeth or sheaves. However, it is within the scope of the invention for the pulleys 14, 16, 18 to be any of a number of different forms and sizes. A portion of the belt 12 between the idler pulleys 16, 18 defines a load-bearing or upper span 28 of the belt 12, and, in this configuration, the upper span 28 can carry loads as the belt 12 travels in the direction of arrow 30.

Figure 2:
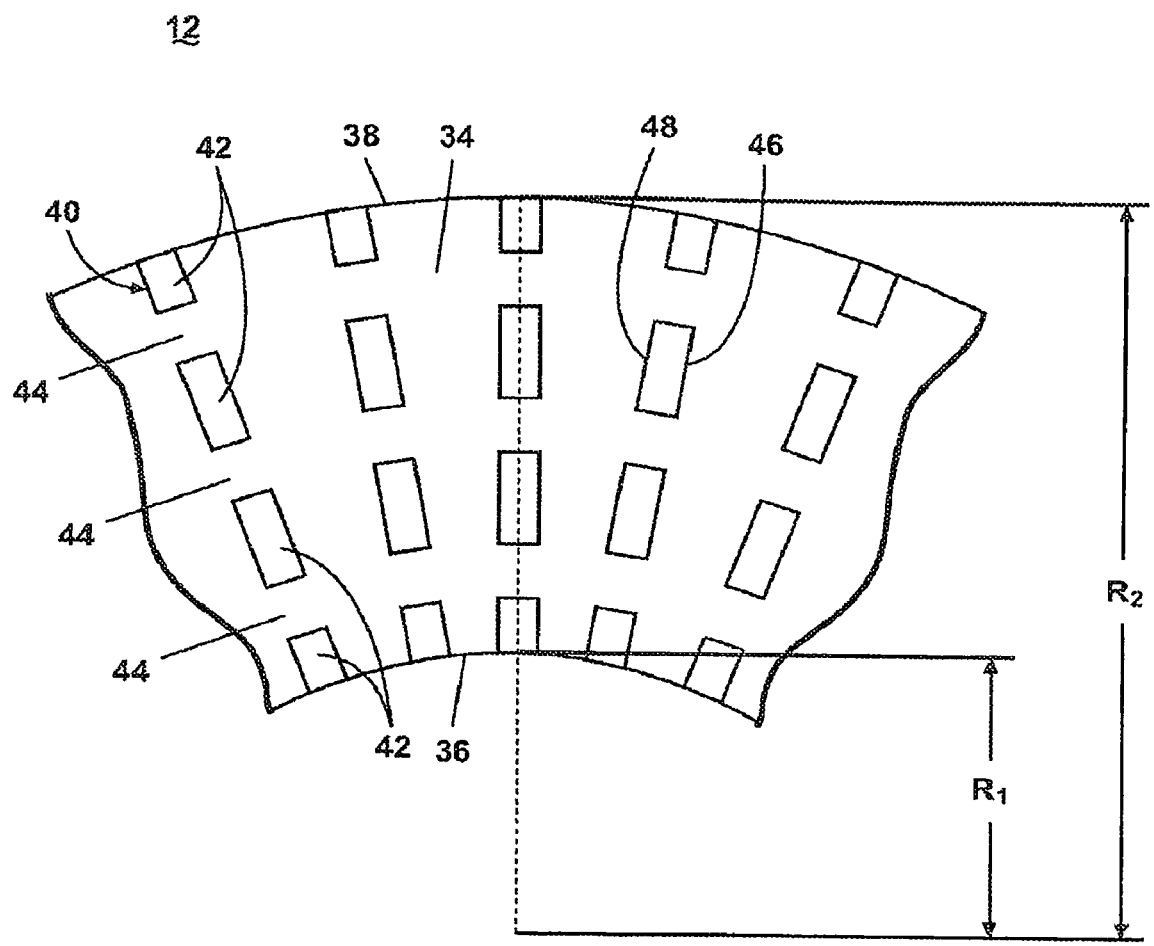
FIG. 2 is a bottom view of the belt from the conveyor shown in FIG. 1

The belt 12 comprises an upper surface 32 and a lower surface 34 joined along an inside edge 36 and an outside edge 38. The distance between the upper and lower surfaces 32, 34 defines a thickness of the belt 12. The upper surface 32 is fairly smooth and free of discontinuities and is typically made of a thermoplastic material, such as Pebax® resin, polyester, or polyurethane. As shown in FIG. 2, which is a view of the lower surface 34 of the belt 12, the belt 12 is curved such that the inside edge 36 has a radius of curvature $R_1$, and the outside edge 38 has a radius of curvature $R_2$, which is greater than $R_1$. The radial distance between the side edges 36, 38 defines a width of the belt 12, i.e., $R_2-R_1$, where $R_1$ can be any value greater than or equal to zero. Because of the curved shape of the belt 12, the outside edge 38 of the belt 12 moves faster than the inside edge 36 of the belt 12 as the belt is driven by the drive pulley 14.

With continued reference to FIG. 2, the belt 12 has a plurality of radial teeth 40 circumferentially spaced from each other on the lower surface 34. The circumferential spacing between adjacent teeth 40 increases from the inside edge 36 to the outside edge 38, and a pitch, or circumferential spacing between the teeth 40 is constant at a given radius. Each of the teeth 40 comprises a plurality of teeth portions 42 extending at least partly across the width of the belt 12 and spaced from one another by gaps 44. Additionally, each of the teeth 40 comprises a driving face 46 and an opposite non-driving face 48. Ideally, each tooth 40 will be radial in shape, i.e., each face 46, 48 being disposed on an imaginary radius of the curve. With this construction, a conical driving pulley will be able to effectively drive the belt 10 regardless of the direction of movement. In other words, the belt 10 will be considered bi-directional.

The terms "upper" and "lower" refer to the opposing surfaces of the belt 12 and are used to differentiate the surface 32 upon which loads are carried and the surface 34 that has the teeth 40. It is apparent in FIG. 1 that the load-bearing surface 32 is not always the "upper" surface, and the toothed surface 34 is not always the "lower" surface, such as for the portions of the belt 12 between one of the idler pulleys 16, 18 and the drive pulley 14. However, for the upper span 28, the load-bearing surface 32 is usually the "upper" surface, and the toothed surface 34 is the "lower" surface. Thus, for convenience, the terms "upper" and "lower" are used to describe the surfaces 32, 34.

Figure 3:
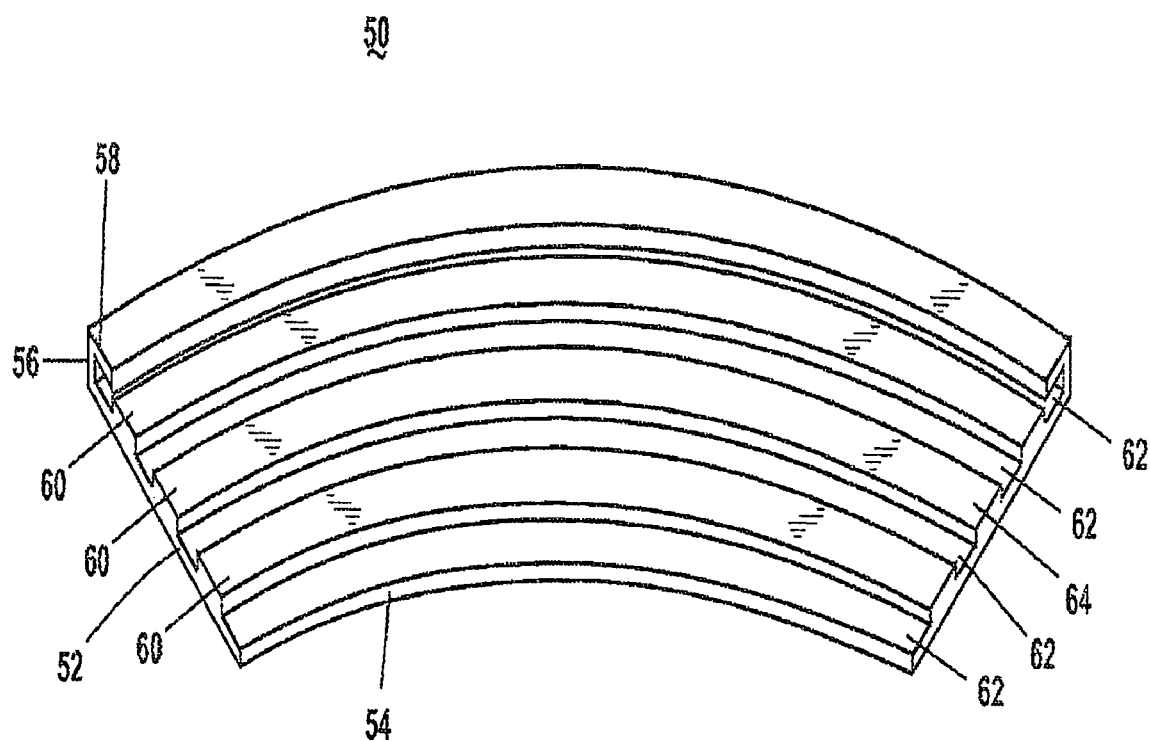
FIG. 3 is a perspective view of the slider bed with guides from the conveyor shown in FIG. 1.

Referring back to FIG. 1, a slider bed 50 located below the lower surface 34 of the belt 12 at least partially supports the upper span 28 of the belt 12. As shown in FIG. 3, which is a perspective view of the slider bed 50, the slider bed 50 comprises a generally planar body 52 shaped and sized to support at least a portion of the belt 12. In the illustrated embodiment, the slider bed 50 extends from an inside edge 54 to an outside edge 56. At the outside edge 56, the slider bed 50 terminates at a stop in the form of an upwardly and radially inwardly extending flange 58. The flange 58 can be separable or removable in order to access the bed 50.

Figure 4:
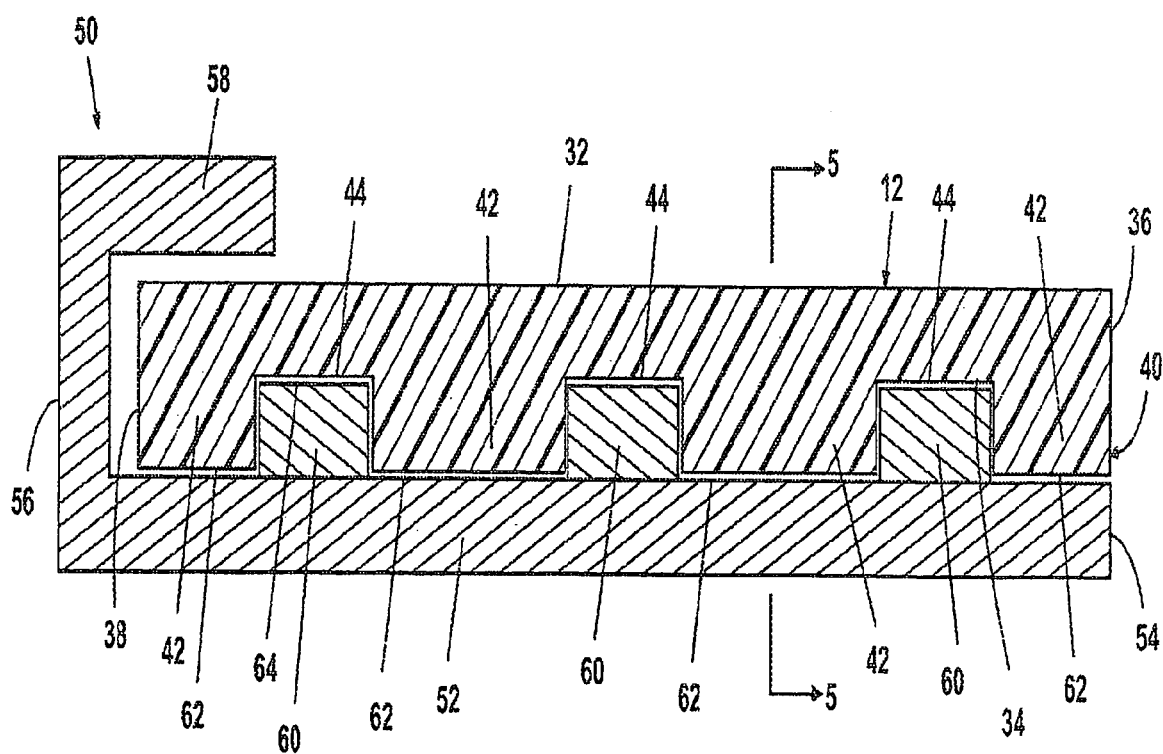
FIG. 4 is a sectional view taken along line 4-4 of FIG. 1.

According to one aspect of the invention, the slider bed 50 comprises at least one guide 60 on the body 52. In the illustrated embodiment, the slider bed 50 comprises a plurality of the guides 60, wherein each of the guides 60 comprises an arcuate rail projecting upward from the body 52 and extending along the body 52 in the direction of belt travel. The guides 60 are radially separated from one another by spaces 62 and have a progressively increasing radius of curvature from the inside edge 54 to the outside edge 56 of the slider bed 50. Further, the guides 60 and the spaces 62 are sized and arranged to mate with the gaps 44 and the teeth portions 42, respectively, on the belt 12. When the belt 12 rests on the slider bed 50, as shown in the lateral sectional view in FIG. 4, the flange 56 receives the outside edge 38 of the belt 12, the gaps 44 on the belt 12 receive the guides 60, and the spaces 62 between the guides 60 receive the teeth portions 42.

Figure 5:
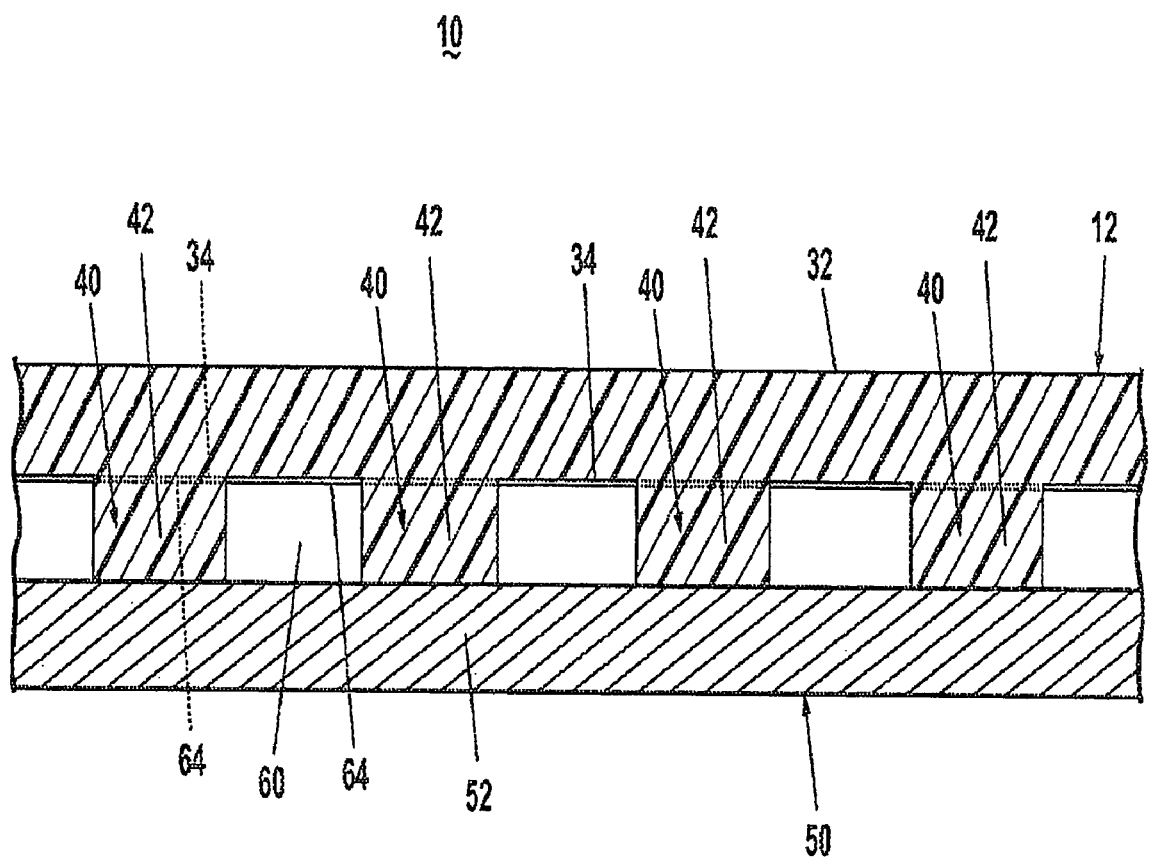
FIG. 5 is a sectional view taken along line 5-5 of FIG. 4.

Preferably, the gaps 44 and the guides 60 have about the same thickness, or, alternatively, the guides 60 can have a thickness greater than the thickness of the gaps 44. As a result, the lower surface 34 of the belt 12 rests on the guides 60, even at the sections of the guides 60 between adjacent teeth 40, as illustrated in the longitudinal sectional view of FIG. 5. According to one embodiment, the gaps 44 and the guides 60 each have a thickness about equal to the thickness of the belt 12.

Figure 6:
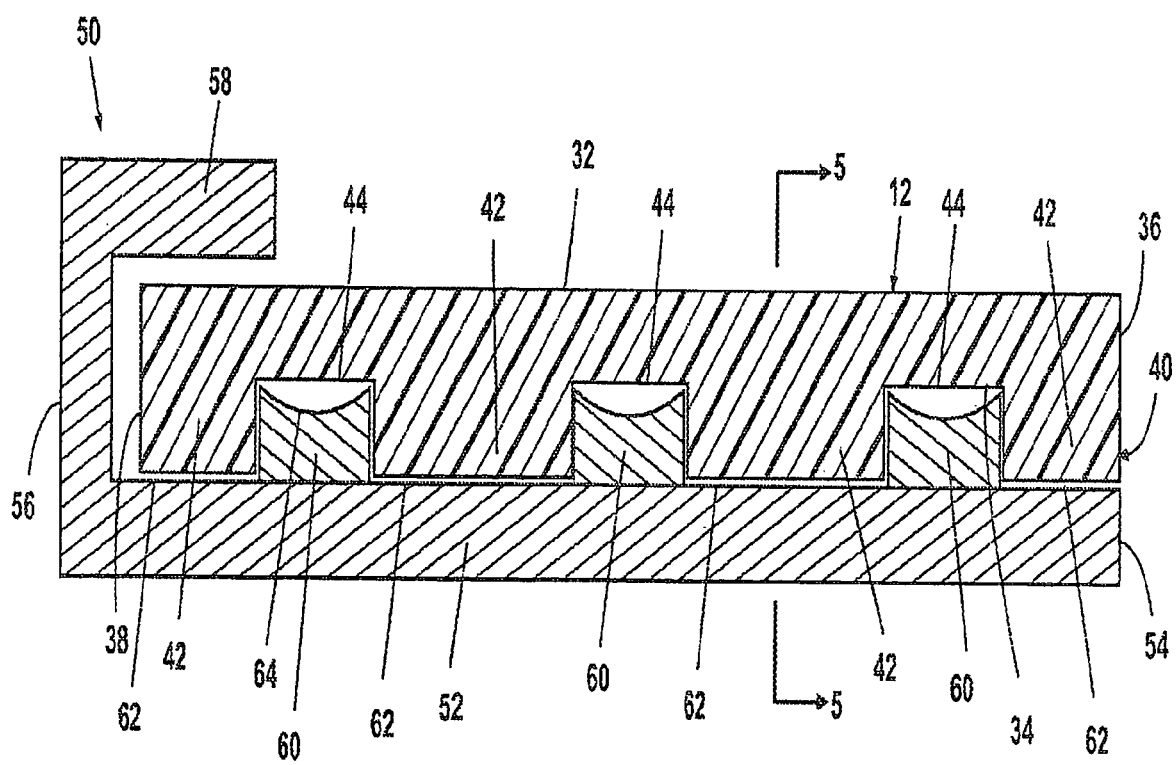
FIG. 6 is a sectional view similar to FIG. 4 showing an alternative embodiment of the guides.

The guides 60 can be integrally formed with the body 52 or made as a separate component attached to the body 52 using any suitable means or process for attachment, such as adhesives, fasteners, friction fits, or joining processes, such as welding. Additionally, the guides 60 can be made of the same material as the body 52 or of a different material. For example, the guides 60 and the body 52 can both be made of a metal or of a polymer, or one of the body 52 and the guides 60 can be made of a metal while the other of the body 52 and the guides 60 can be made of a polymer. An exemplary material for use in the manufacture of the guides 60 is an ultra high molecular weight (UHMW) polymer. To minimize drag between the belt 12 and the guides 60, the guides 60 can be made of or coated with a material having a relatively low coefficient of friction. For example, the guides 60 can be coated with a friction reducing material, such as polytetrafluoroethylene (PTFE), also known as Teflon®. Additionally, the guides 60 can be designed to have a minimum surface area that contacts the belt 12. For example, as shown in FIG. 6, the guides 60 can have a curved or depressed upper surface 64 as opposed to the flat upper surface 64 in the embodiment of FIG. 4.

Figure 7:
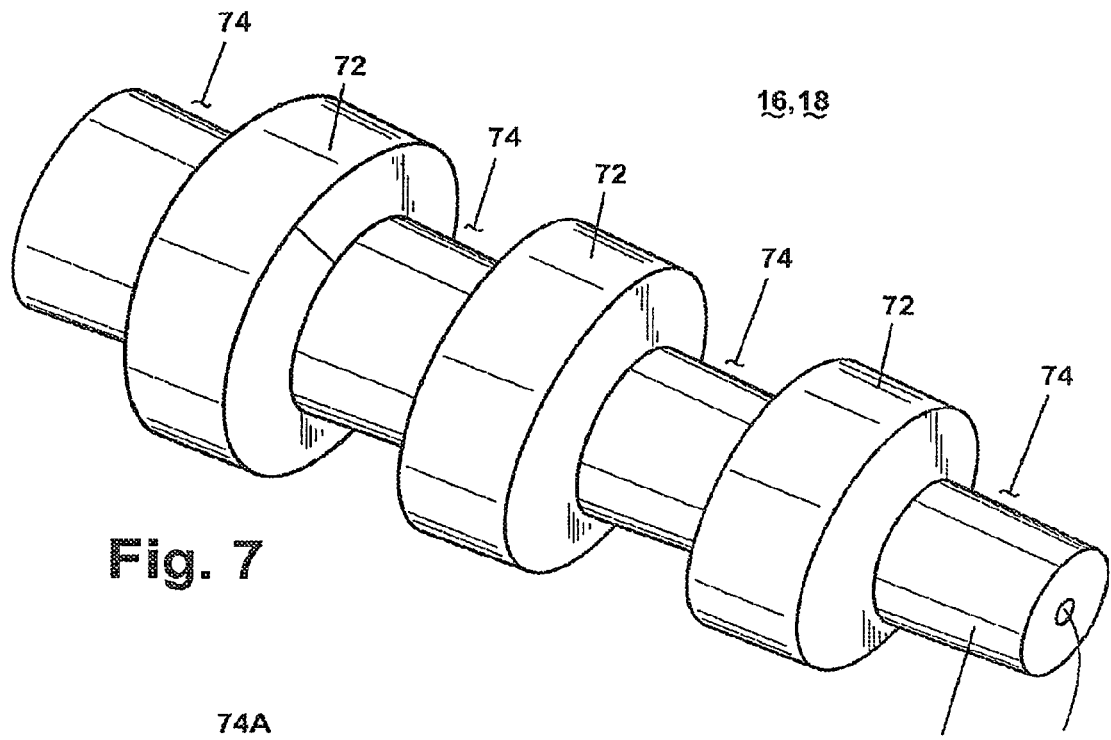
FIG. 7 is a perspective view of an idler pulley from the conveyor shown in FIG. 1.
Figure 8:
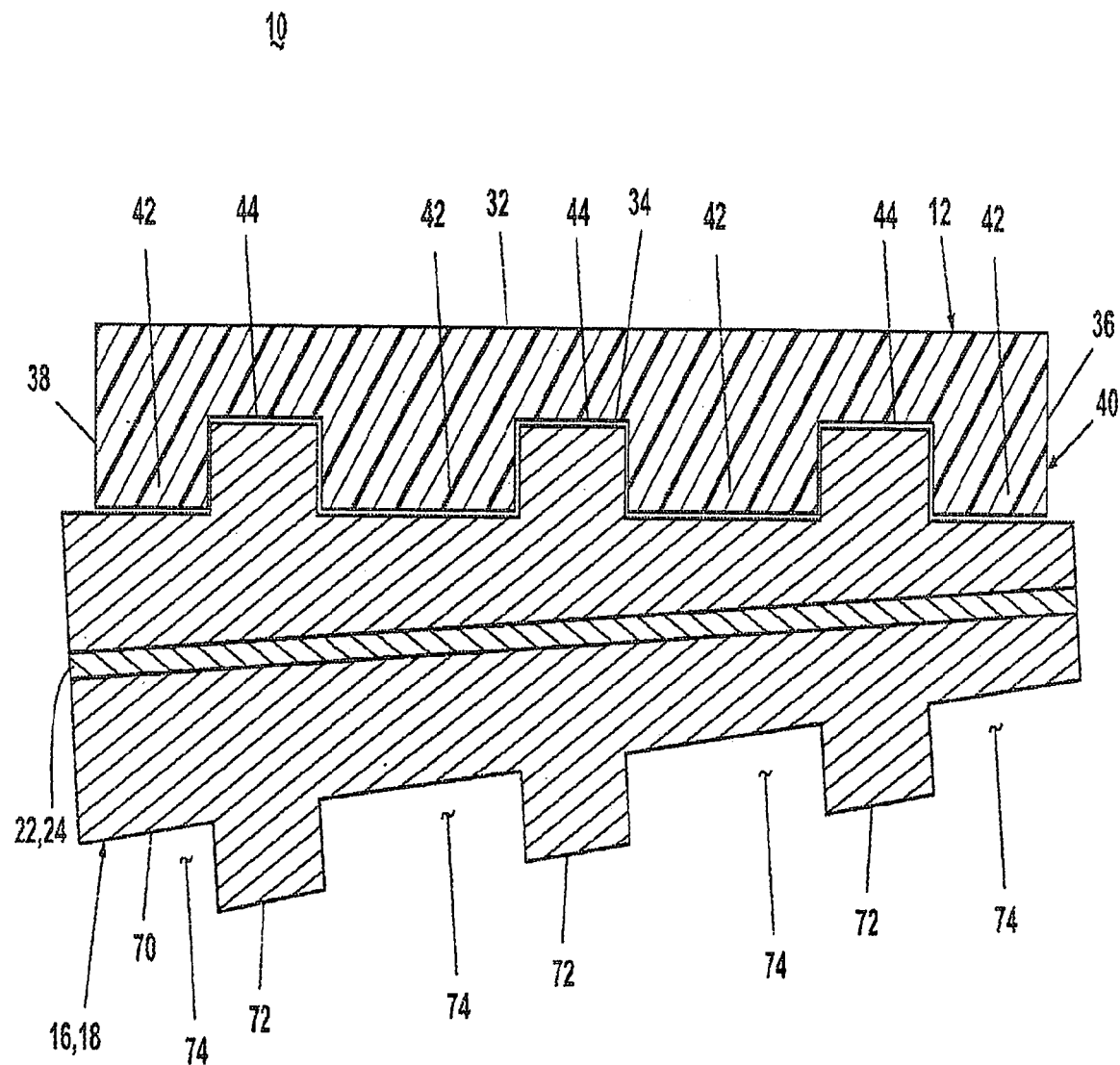
FIG. 8 is a sectional view taken along line 8-8 of FIG. 1.

Referring now to FIG. 7, which is a perspective view of the idler pulley 16 or 18, the idler pulleys 16, 18 each comprise a main roller 70 and a number of partial rollers 72 extending radially from the main roller 70 and separated by spaces 74 to accommodate the teeth 40 on the belt 12. According to the illustrated embodiment, the main roller 70 is frustoconical to accommodate the varying speed of the belt 12 between the inside and outside edges 36, 38. The number of partial rollers 72 equals the number of the gaps 44 between the teeth portions 42, which is equal to the number of the guides 60. As shown in the lateral sectional view of FIG. 8, the partial rollers 72 and the spaces 74 are sized and arranged to mate with the gaps 44 and the teeth portions 42, respectively, of the belt 12. It follows, therefore, that the partial rollers 72 are spaced from one another a distance equal to the spacing between the guides 60. Preferably, the radial thickness of each of the partial rollers 72 (i.e., the difference between the radius of the main roller 70 and the radius of the partial roller 72) is about equal to the thickness of the gaps 44, or, alternatively, the radial thickness of the partial rollers 72 can be greater than the thickness of the gaps 44. As a result of this configuration, the lower surface 34 of the belt 12 rests on the partial rollers 72, even at the sections of the partial rollers 72 between adjacent teeth 40. While the idler pulleys 16, 18 are shown as being smooth, it is within the scope of the invention for the idler pulleys 16, 18 to comprise a plurality of teeth spaced by sheaves that are adapted to engage the belt teeth 40.

Figure 7A:
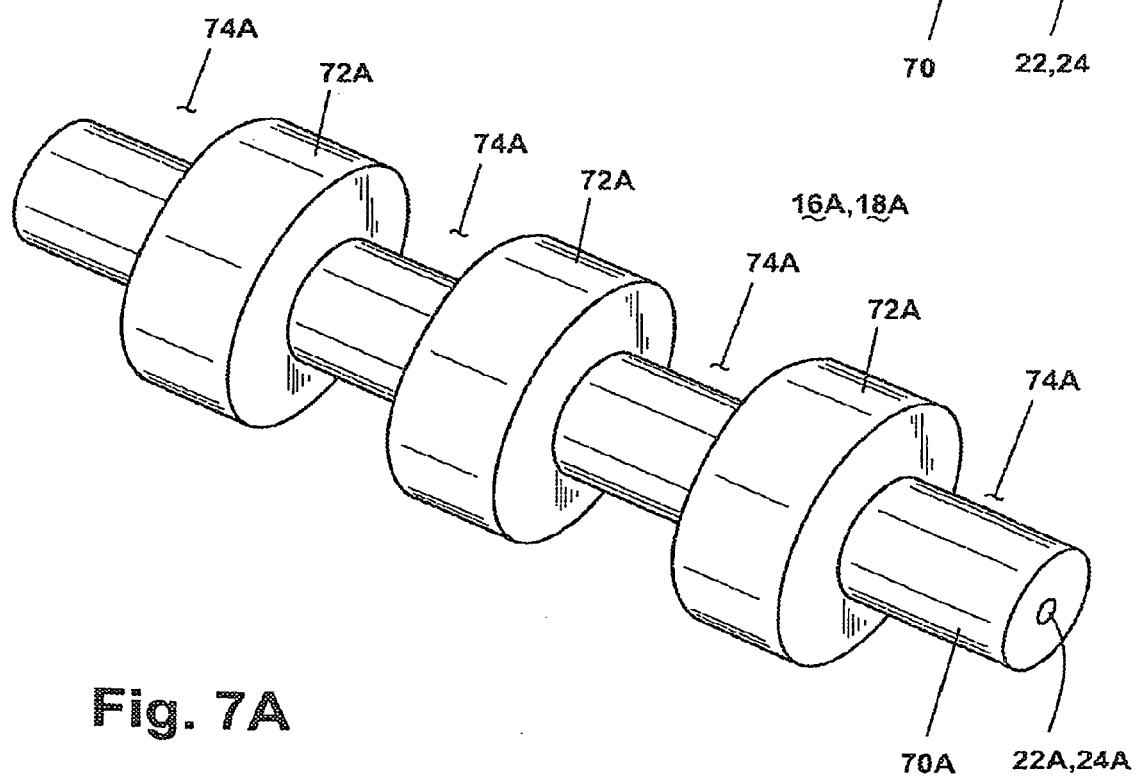
FIG. 7A is a perspective view of an alternative embodiment of an idler pulley.

It will be apparent that other configurations of idler pulleys can accommodate the invention. For example, in FIG. 7a, the idler pulley 18A can be made of several individual rollers 72A, each separately rotatable on a single shaft 70A and each having the same diameter. Thus, the rollers nearer to the outside edge of the belt will rotate faster than the rollers nearer to the inside edge of the belt. In this manner an effectively cylindrical idler pulley can be used. An advantage to this configuration is that a smaller diameter, more even transfer can be accomplished between the curved portion and an adjacent conveyor.

Because the belt 12 of the conveyor 10 is curved, the speed of the belt 12 varies from the inside edge 36 to the outside edge 38, and the drive pulley 14 must be adapted to accommodate this difference in speed. The drive pulley 14 can be adapted in several ways, an example of which is shown with respect to the embodiment of the conveyor 10 in FIG. 1.

Figure 9:
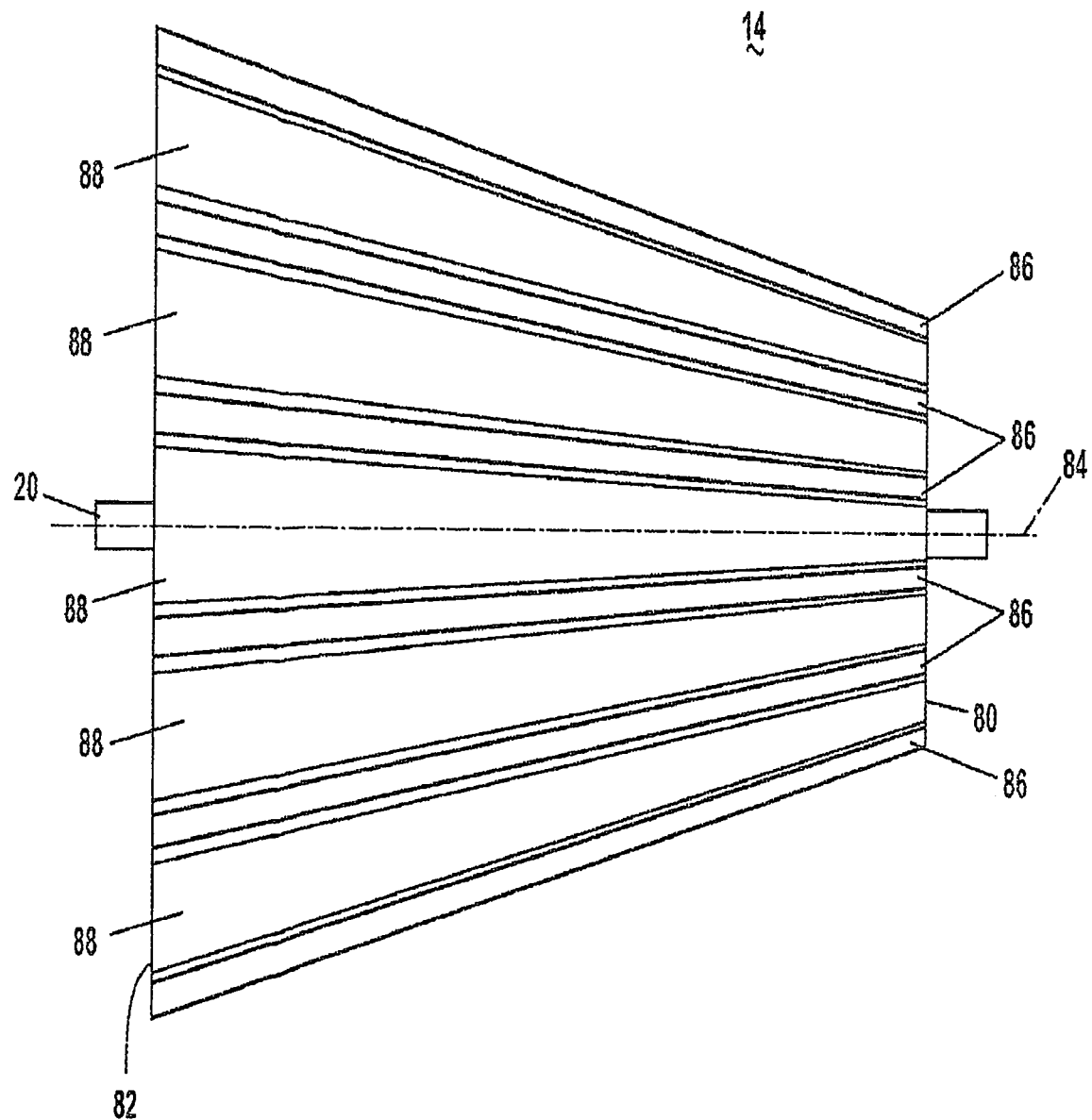
FIG. 9 is a side view of a drive pulley from the conveyor shown in FIG. 1.

The drive pulley 14 from FIG. 1 is more clearly shown in FIG. 9, which is a side view of the drive pulley 14. As seen in FIG. 9, the drive pulley 14 is frustoconical and terminates at inside and outside edges 80, 82, wherein the inside edge 80 has a smaller diameter than the outside edge 82. As a result of the frustoconical shape, the speed at the surface of the drive pulley 14 varies from the inside edge 80 to the outside edge 82 as the drive pulley 14 rotates about a central longitudinal axis 84. Additionally, the drive pulley 14 comprises a plurality of radial teeth 88 spaced by radial sheaves 86. The teeth 88 can be continuous across the width of the drive pulley 14, as shown in FIG. 9, or can be discontinuous, much like the discontinuous teeth 40 on the belt 12. A pitch, or circumferential spacing of the teeth 88 or sheaves 86, is constant at a given radius or radial distance from one of the inside or outside edges 80, 82. To transmit torque from the drive pulley 14 to the belt 12, the drive pulley sheaves 86 receive the belt teeth 40 as the belt 12 wraps around the drive pulley 14, and at least one of the drive pulley teeth 88 abuts the driving face 46 of a corresponding at least one of the belt teeth 40. Details of an exemplary drive mechanism for transmitting torque from the drive sprocket 14 to the belt 12, including factors such as the relative pitches of the drive pulley 14 and the belt 12 and the relative dimensions of the drive pulley sheaves 86 and the belt teeth 40, are described in U.S. Patent Application No. 60/593,493, which is incorporated herein by reference in its entirety. Because the drive pulley 14 induces movement of the belt 12, and the drive pulley 14 is frustoconical, the dimensions of the drive pulley 14 can be selected so that the speed of the drive pulley 14 varies along the surface of the drive pulley 14 in a manner commensurate with the necessary varying speed of the belt 12.

During operation of the conveyor 10, the drive pulley 14 rotates about the shaft 20, and the drive pulley sheaves 86 engage the belt teeth 40 to transmit torque to the belt 12 as described above. The belt 12 and the drive pulley 14 are arranged such that the belt inside and outside edges 36, 38 are near the drive pulley inside and outside edges 80, 82, respectively, whereby the speed of the drive pulley 14 varies along the surface of the drive pulley 14 to accommodate the curved shape of the belt 12. As the drive pulley 14 moves the belt 12 in the direction of the arrow 30, the belt 12 wraps around the idler pulleys 16, 18 while the upper span 28 moves from one of the idler pulleys 16 toward the other idler pulley 18. In particular, the spaces 74 between the partial rollers 72 of the idler pulleys 16, 18 receive the teeth portions 42 of the belt teeth 40 while the gaps 44 receive the partial rollers 72 to prevent radial inward migration of the belt 12 as it wraps around the idler pulleys 16, 18. As a result, the belt 12 smoothly wraps around the idler pulleys 16, 18, which are free to rotate around the shafts 22, 24 if the movement of the belt 12 induces movement of the idler pulleys 16, 18. The frustoconical shape of the main roller 70 of the idler pulleys 16, 18 accommodates the varying speed of the belt 12 across the width of the belt 12. The partial rollers 72 are aligned with the guides 60 on the slider bed 50 so that as the upper span 28 of the belt 12 leaves one of the idler pulleys 16, the teeth portions 42 and the gaps 44 of the belt teeth 40 are aligned with the spaces 62 and the guides 60, respectively, of the slider bed 50. Similarly, when the upper span 28 leaves the slider bed 50 and approaches the other idler pulley 18, the teeth portions 42 and the gaps 44 of the belt teeth 40 are aligned with the spaces 74 and the partial rollers 72, respectively, of the idler pulley 16. As the upper span 28 of the belt 12 progresses along the slider bed 50, the guides 60 track the movement of the upper span 28 and prevent radial migration of the belt 12. In other words, the guides 60 effectively function as barricades that thwart radial inward movement of the teeth 40 and oppose forces drawing the belt 12 radially inward.

Figure 10:
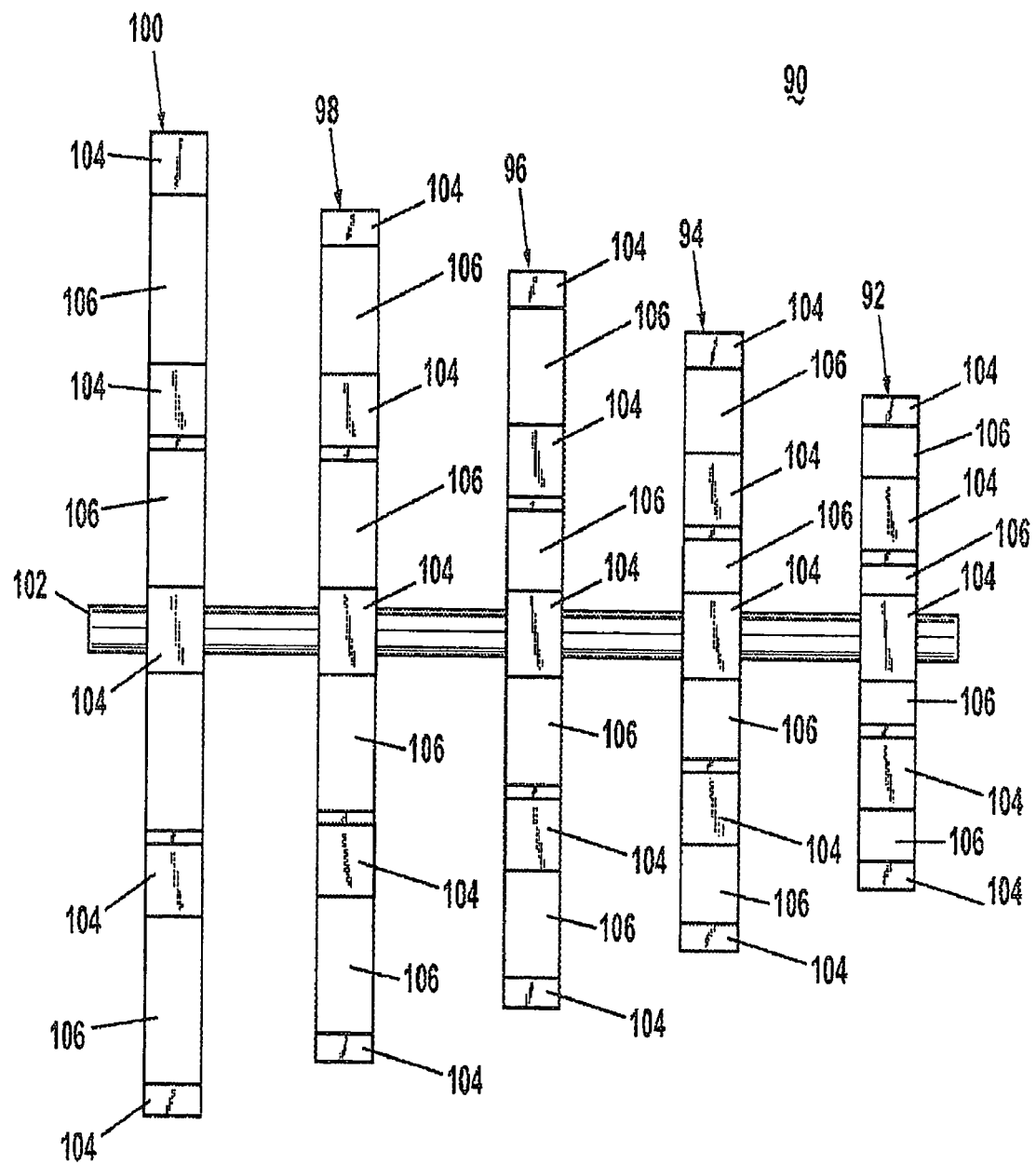
FIG. 10 is a side view of an alternative embodiment of a drive pulley for the conveyor of FIG. 1.
Figure 11A:
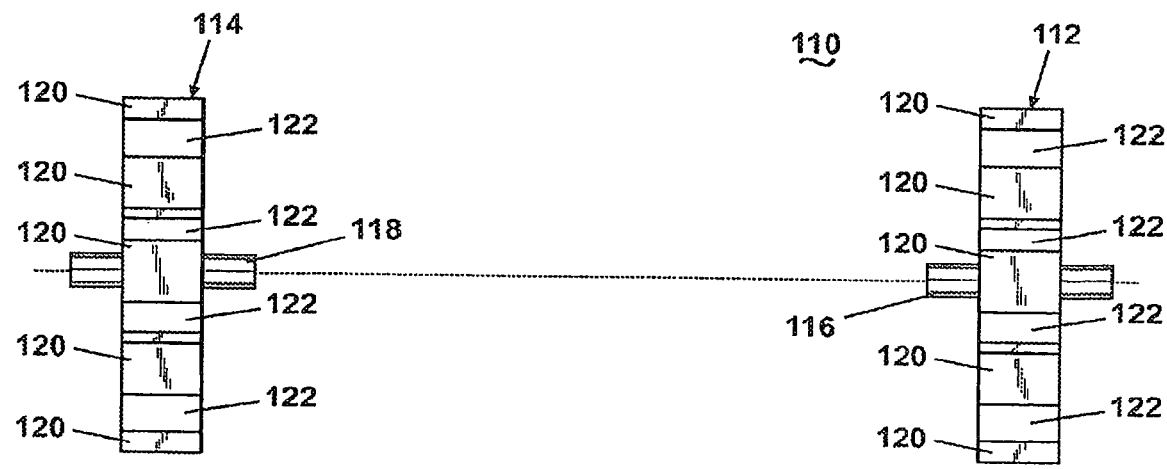
FIG. 11A is a side view of another alternative embodiment of a drive pulley for the conveyor of FIG. 1.
Figure 11B:
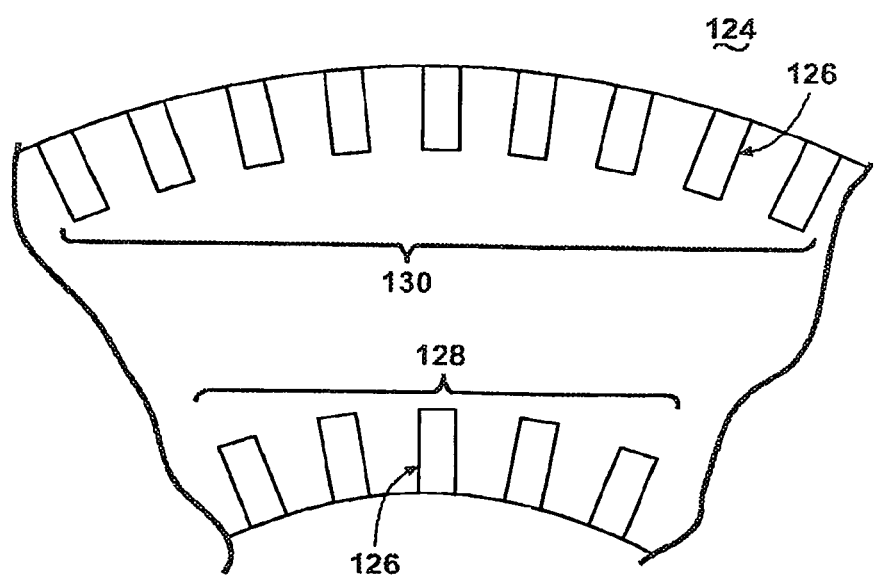
FIG. 11B is a bottom view of an alternative belt for use with the drive pulley of FIG. 11A.
Figure 12:
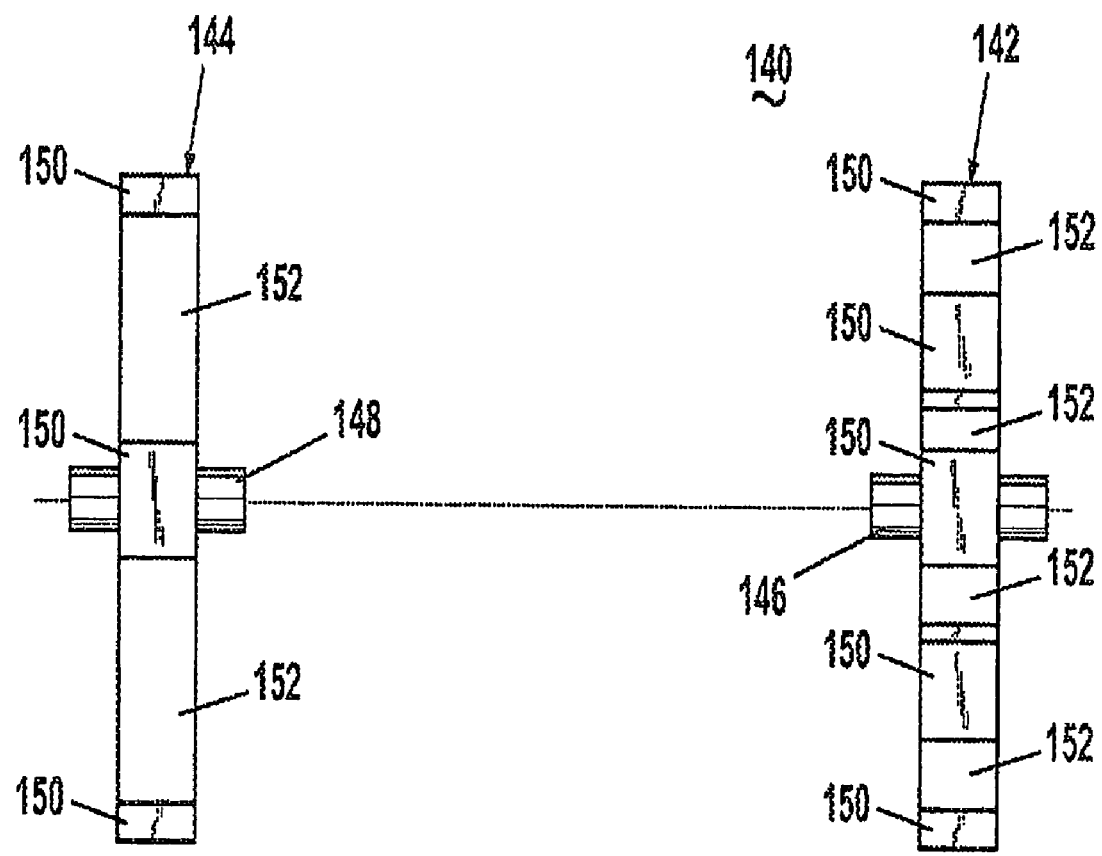
FIG. 12 is a side view of another alternative embodiment of a drive pulley for the conveyor of FIG. 1

Alternative embodiments of the drive pulley 14 adapted to accommodate the varying speed of the belt 12 are illustrated in FIGS. 10-12. In the embodiment of FIG. 10, which is a side view of an alternative drive pulley 90, the drive pulley 90 comprises a plurality of individual pulleys 92, 94, 96, 98, 100 of increasing diameter mounted for rotation with a central shaft 102. The drive pulley 90 can include any suitable number of the individual pulleys and is shown in FIG. 10 by example as having the five individual pulleys 92, 94, 96, 98, 100. Because of the differing diameters of the individual pulleys 92, 94, 96, 98, 100, the surface of each of the individual pulleys 92, 94, 96, 98, 100 moves at a different speed while the central shaft 102 rotates, with the smallest individual pulley 92 having the slowest speed, and the largest individual pulley 100 having the fastest speed. Thus, the drive pulley 90 and the belt 12 are situated so that the individual pulleys 92, 94, 96, 98, 100 are arranged from smallest to largest from the inside edge 36 to the outside edge 38 of the belt 12. Additionally, each of the individual pulleys 92, 94, 96, 98, 100 is shown as comprising-teeth 104 and sheaves 106 oriented generally parallel to the axis of rotation of the individual pulleys 92, 94, 96, 98, 100. Alternatively, the teeth 104 and the sheaves 106 can be radially oriented in a manner similar to that shown with respect to the drive pulley 14 in the embodiment of FIG. 9. The size, shape, and orientation of the teeth 104 and the sheaves 106 can be determined based on the size, such as the width, of each of the individual pulleys 92, 94, 96, 98, 100. For example, each sheave (or tooth) can be curved to minimize the area of contact between them in the curve.

In the embodiment of FIG. 11A, which is a side view of another alternative drive pulley 110, the drive pulley 110 comprises multiple individual pulleys having about the same diameter. The drive pulley 110 can include any suitable number of the individual pulleys and is shown in FIG. 11A by example as having two individual pulleys, an inside pulley 112 and an outside pulley 114. The inside and outside pulleys 112, 114 are each rotatable with a respective central shaft 116, 118 and comprise a plurality of teeth 120 separated by sheaves 122. In the current embodiment, the pitch of the teeth 120/sheaves 122 is about the same for both the inside pulley 112 and the outside pulley 114.

For this embodiment of the drive pulley 110, the conveyor 10 employs an alternative belt 124 shown in FIG. 11B, which is a bottom view of the belt 124. The belt 124 is similar to the belt 12 of the embodiment shown in FIG. 2, but the belt 124 of FIG. 11B has a different arrangement of teeth. As with the belt 12, the belt 124 comprises a plurality of teeth 126 that are discontinuous, but the teeth 126 are arranged according to the drive pulley 110. In particular, the teeth 126 are arranged into sets of the teeth 126, with each set corresponding to one of the individual pulleys. In the illustrated embodiment, therefore, the teeth 126 are arranged into an inside set 128 corresponding to the inside pulley 112 and an outside set 130 corresponding to the outside pulley 114. Because the pitch of the inside pulley 112 is about the same as that of the outside pulley 114, the inside set 128 of the teeth 126 has a pitch that is about the same as a pitch of the outside set 130 of the teeth 126. Because of the curvature of the belt 124 and equal pitch for the inside and outside teeth sets 128, 130, the inside set 128 has fewer teeth 126 than the outside set 130 over a given length of the belt 124.

During operation of the conveyor 10 having the drive pulley 110 of FIG. 11A and the belt 124 of FIG. 11B, the inside and outside pulleys 112, 114 are aligned with the inside and outside sets 128, 130 of the teeth 126. The outside pulley 114 is driven at a faster speed than the inside pulley 112 to accommodate the higher speed of the outside edge of the belt 124. The difference in speed between the inside and outside pulleys 112, 114 is accommodated, even though both have the same pitch, due to the difference in the number of the teeth 126 for the inside and outside sets 128, 130 of the teeth 126. The larger number of the teeth 126 in the outside set 130 allows the outside pulley 114 to drive the outside of the belt at a faster speed.

Each of the inside and outside pulleys 112, 114 is shown as comprising the teeth 120 and the sheaves 122 oriented generally parallel to the axis of rotation of the inside and outside pulleys 112, 114. Alternatively, the teeth 120 and the sheaves 122 can be radially oriented in a manner similar to that shown with respect to the drive pulley 14 in the embodiment of FIG. 9. The size, shape, and orientation of the teeth 120 and the sheaves 122 can be determined based on the size, such as the width, each of the inside and outside pulleys 112, 114. Furthermore, the belt 124 can be utilized with the guide 60 shown with respect to the embodiment of FIG. 3. The guide 60 can be sized and arranged on the slider bed 50 to accommodate the size and positioning of the teeth 126.

In the embodiment of FIG. 12, which is a side view of another alternative drive pulley 140, the drive pulley 140 comprises multiple individual pulleys having the same diameter. As with the drive pulley 110 of the FIG. 11A embodiment, the drive pulley 140 can include any suitable number of the individual pulleys and is shown in FIG. 12 by example as having two individual pulleys, an inside pulley 142 and an outside pulley 144. Further, as with the drive pulley 110, the inside and outside pulleys 142, 144 of the drive pulley 140 are each rotatable with a respective central shaft 146, 148 and comprise a plurality of teeth 150 separated by sheaves 152. The drive pulley 140 differs from the drive pulley 110, however, because the inside and outside pulleys 142, 144 have differing pitches. In the current embodiment, the pitch of the teeth 150 for the inside pulley 142 is less (i.e., the spacing between the teeth 150 is less) than that of the outside pulley 144. As a result, the belt 12 can be utilized with the drive pulley 140 rather than employing the alternative belt 124.

During operation of the conveyor 10 having the drive pulley 140, the inside and outside pulleys 142, 144 are arranged in a suitable position relative to the belt 12, such as with the inside pulley 142 near the belt inside edge 36 and the outside pulley 144 near the belt outside edge 38. The outside pulley 144 is driven at a faster speed than the inside pulley 142 to accommodate the varying speed of the belt 12. The difference in speed between the inside and outside pulleys 142, 144 is possible due to the difference in pitch between the inside and outside pulleys 142, 144; the larger pitch of the outside pulley 144 allows the outside pulley 144 to be driven at a faster speed.

Each of the inside and outside pulleys 142, 144 is shown as comprising the teeth 150 and the sheaves 152 oriented generally parallel to the axis of rotation of the inside and outside pulleys 142, 144. Alternatively, the teeth 150 and the sheaves 152 can be radially oriented in a manner similar to that shown with respect to the drive pulley 14 in the embodiment of FIG. 9. The size, shape, and orientation of the teeth 150 and the sheaves 152 can be determined based on the size, such as the width, each of the inside and outside pulleys 142, 144.

Figure 13:
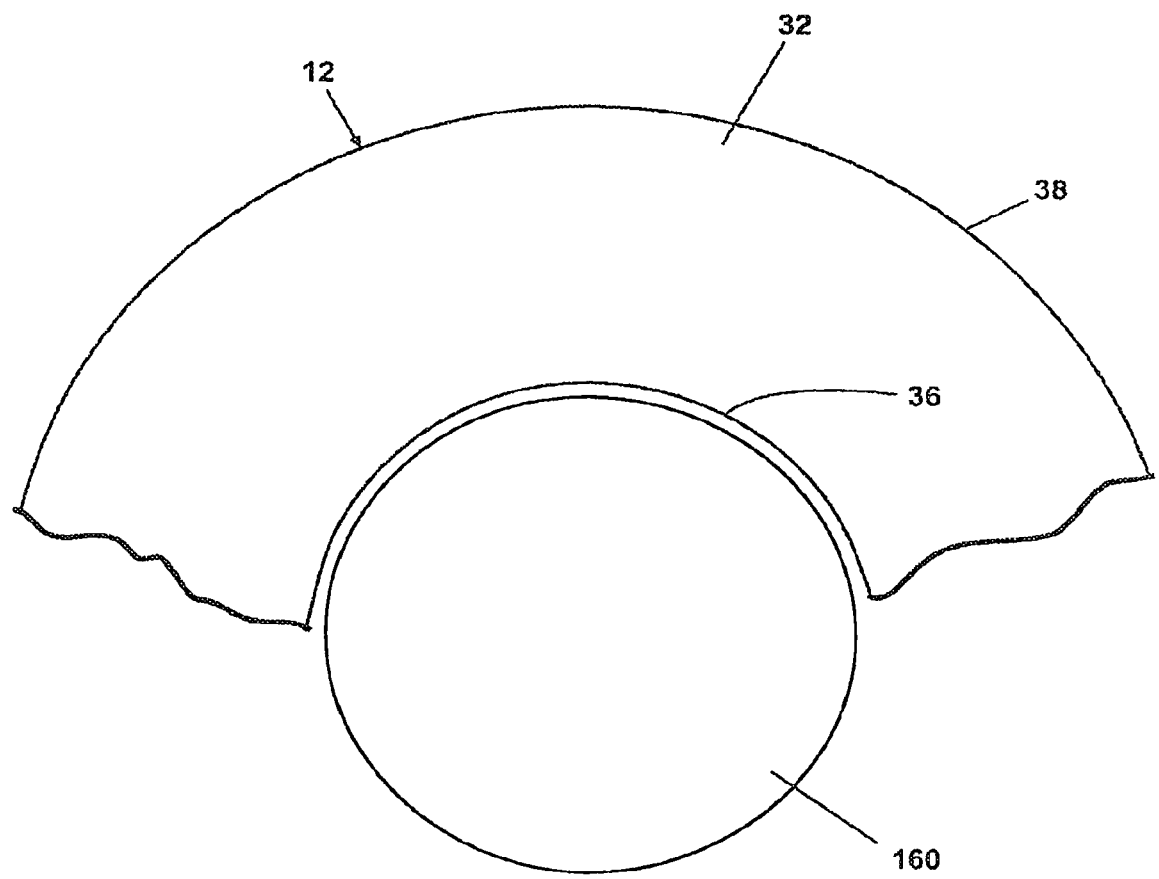
FIG. 13 is a schematic top view of a belt and a center wheel guide according to one embodiment of the invention.

In addition to or as an alternative to the guide 60 on the slider bed 50, the conveyor 10 can comprise a center wheel guide 160 to facilitate tracking of the belt 12. All exemplary center wheel guide 160 is shown in FIG. 13, which is a schematic top view of the belt 12 and the center wheel guide 160. The center wheel guide 160 is a generally circular, elliptical, arcuate, or oval body positioned adjacent to the inside edge 36 of the belt 12. The presence of the center wheel guide 160 interferes with inward radial migration of the belt 12. The center wheel guide 160 can be stationary or can rotate as the belt 12 moves.

Figure 14:
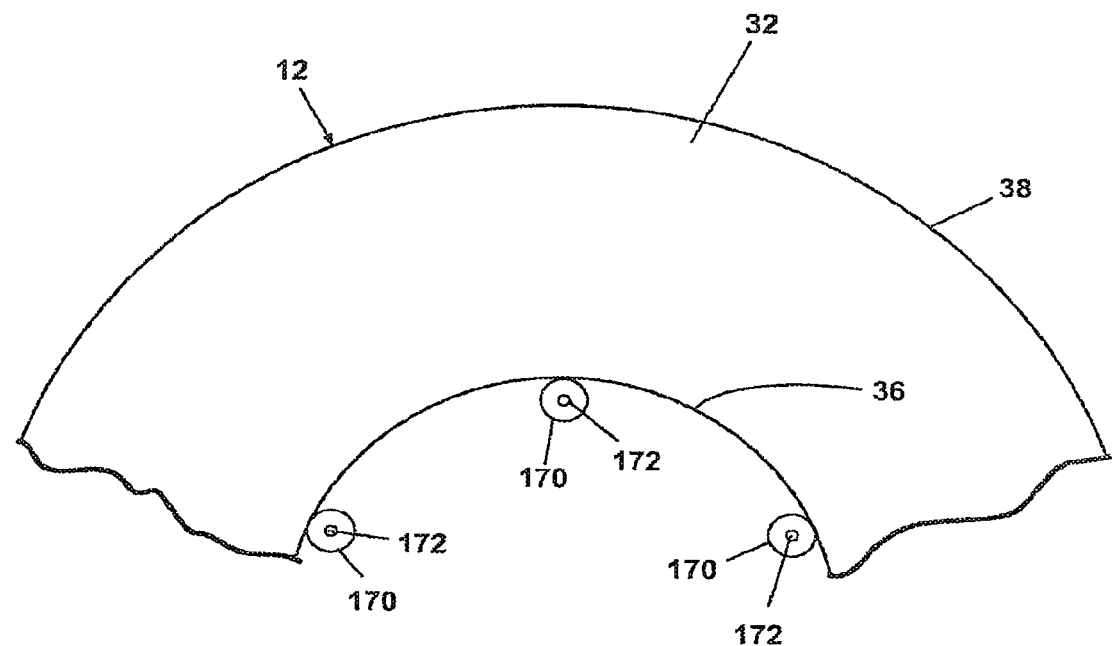
FIG. 14 is a schematic top view of a belt and guide posts according to one embodiment of the invention.

In addition to or as an alternative to the guide 60 on the slider bed 50, the conveyor 10 can comprise one or more guide posts 170 to facilitate tracking of the belt 12. Exemplary guide posts 170 are shown in FIG. 14, which is a schematic top view of the belt 12 and the guide posts 170. Each of the guide posts 170 comprises a generally vertical body, such as a cylindrical body. The guide posts 170 can be rotatable about a longitudinal shaft 172 or stationary. Each of the guide posts 170 is located adjacent to the inside edge 36 of the belt 12 such that the presence of the guide posts 170 interferes with inward radial migration of the belt 12. The number of the guide posts 170 employed depends on the configuration of the conveyor 10. For example, if the belt 12 has a relatively large turn (i.e., greater than about a 100 degree turn) or in a center drive conveyor, then multiple guide posts can be used, such as the three guide posts 170 shown in FIG. 14 by example. As another example, when the turn is relatively small (i.e., less than about a 100 degree turn), then only one guide post may be required, and the guide post can be positioned, for example, near an idler pulley.

Figure 15:
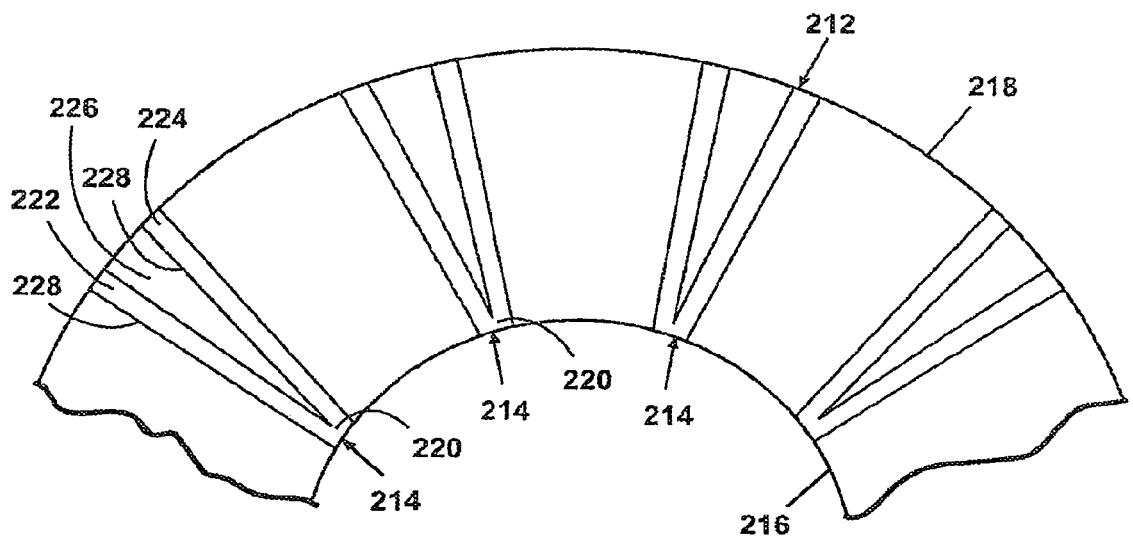
FIG. 15 is a bottom view of a portion of a belt showing an alternate embodiment of tooth pattern.

FIG. 15 shows an alternative embodiment of the tooth arrangement on a belt 212. Teeth 214 extend radially from the inside edge 216 to the outside edge 218. However, each tooth 214 is "V-shaped", comprising an apex 220 and two arms 222, 224 extending therefrom. The arms define a relief section 226 between them, and each arm has a driving face 228 adapted to engage a sheave on a driving pulley, such as that shown in FIG. 10. It will be apparent that the driving faces will be reversed if the belt 212 is moved in the opposite direction. The belt 212 is truly bi-directional.

The conveyor 10 has been shown in the figures and described above as a center drive conveyor with a pair of idler pulleys and a drive pulley; however, it is within the scope of the invention for the conveyor 10 to have other configurations, such as the belt wrapped around a drive pulley and a single idler pulley.

The inventive conveyor 10 provides several advantages in addition to preventing radial belt migration. For example, the large inward radial force due to, at least in part, belt pretension is greatly reduced for the conveyor 10, and, as a result, the frame for the conveyor 10 can be much simpler and lighter.

While the invention has been specifically described in connection with certain specific embodiments thereof, it is to be understood that this is by way of illustration and not of limitation, and the scope of the appended claims should be construed as broadly as the prior art will permit. For example, the teeth can be located on the drive pulley (and/or idler pulleys if needed) and the sheaves or recesses can be on the belt.

What is claimed is:

1. A curved conveyor comprising an endless, substantially untensioned belt having a continuous surface, an inside edge and an outside edge, the outside edge being longer than the inside edge to accommodate moving the belt on the radius of a curve, a drive pulley mounted for rotation, one of the belt and drive pulley having teeth and the other of the belt and drive pulley having sheaves, with at least one tooth in driving engagement with a sheave as the belt wraps around the pulley causing a span of the belt to move in the curve, a slider bed on which the span of the belt slides as it moves in the curve, and at least one guide extending from the slider bed between the slider bed and the belt and engaging the belt in the curve to resist radial migration of the belt inwardly of the curve.

2. The curved conveyor according to claim 1, wherein the guide comprises a rail on the slider bed.

3. The curved conveyor according to claim 1, further comprising a center guide wheel.

4. The curved conveyor according to claim 3 further comprising an idler about which the belt wraps at each end of the curve, and at least one guide extending from each idler between the idler and the belt and engaging the belt to resist radial migration of the belt inwardly of the curve.

5. The curved conveyor according to claim 4 wherein the idlers are pulleys.

6. The curved conveyor according to claim 5 wherein the idler pulleys are conical.

7. The curved conveyor according to claim 1, further comprising at least one guide post positioned along the inside edge of the belt.

8. The curved conveyor according to claim 1, wherein the belt is formed of thermoplastic.

9. The curved conveyor according to claim 1 wherein the belt has teeth and the drive pulley has sheaves.

10. The curved conveyor according to claim 9 wherein each tooth has a gap aligned with the guide so that the guide is received in the gaps as the belt slides on the slider bed.

11. The curved conveyor according to claim 10 wherein the slider bed has multiple guides and each tooth has multiple gaps corresponding to the guides so that guides are received in the gaps as the belt slides on the slider bed.

12. The curved conveyor according to claim 1 wherein the drive pulley is conical.

13. The curved conveyor according to claim 1 further comprising a plurality of guides extending from the slider bed.

14. The curved conveyor according to claim 1 further comprising means to minimize friction between the at least one guide and the belt.

15. The curved conveyor according to claim 1 further comprising at least one idler about which the belt wraps, and at least one guide extending from the at least one idler between the idler and the belt and engaging the belt to resist radial migration of the belt inwardly of the curve.

* * * * *